(12) United States Patent
Konuma et al.

(10) Patent No.: US 11,137,597 B2
(45) Date of Patent: Oct. 5, 2021

(54) IMAGE DISPLAY APPARATUS

(71) Applicant: SAMSUNG ELECTRONICS CO., LTD., Suwon-si (KR)

(72) Inventors: Osamu Konuma, Kanagawa-ken (JP); Takayuki Sasaoka, Kanagawa-ken (JP); Katsutoshi Sasaki, Kanagawa-ken (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/797,649

(22) Filed: Feb. 21, 2020

(65) Prior Publication Data

US 2020/0310116 A1 Oct. 1, 2020

(30) Foreign Application Priority Data

Mar. 28, 2019 (JP) .............................. JP2019-062832
Oct. 1, 2019 (KR) ......................... 10-2019-0121727

(51) Int. Cl.
*G02B 27/01* (2006.01)
*G02F 1/1335* (2006.01)

(52) U.S. Cl.
CPC ..... *G02B 27/0103* (2013.01); *G02B 27/0179* (2013.01); *G02F 1/133526* (2013.01); *G02B 2027/0123* (2013.01); *G02B 2027/0187* (2013.01)

(58) Field of Classification Search
CPC ................................................ G02B 27/0101
See application file for complete search history.

(56) References Cited

U.S. PATENT DOCUMENTS

| 7,567,385 B2 | 7/2009 | Yamazaki et al. |
| 7,773,571 B1 | 8/2010 | Maxwell et al. |
| 10,120,189 B2 | 11/2018 | Saito et al. |
| 10,345,585 B2 | 7/2019 | Kawana |

(Continued)

FOREIGN PATENT DOCUMENTS

| EP | 3 379 320 A1 | 9/2018 |
| JP | 8-50256 A | 2/1996 |

(Continued)

OTHER PUBLICATIONS

Communication dated Sep. 11, 2020 issued by the European Patent Office in European Patent Application No. 20161500.2.

*Primary Examiner* — Alexander P Gross
(74) *Attorney, Agent, or Firm* — Sughrue Mion, PLLC

(57) ABSTRACT

An image display apparatus including a first light source, a spherical lens configured to receive light output from the first light source, an aspherical lens configured to receive light output from the spherical lens, a first free curved mirror configured to receive light output from the aspherical lens is incident, a second free curved mirror configured to receive light output from the first free curved mirror, a third free curved mirror configured to receive light output from the second free curved mirror, and an image display panel configured to receive light output from the third free curved mirror and configured to display image information, wherein a light path of the light output from the first free curved mirror, a light path of the light output from the second free curved mirror, and a light path of the light output from the third free curved mirror intersect each other.

18 Claims, 17 Drawing Sheets

(56) References Cited

U.S. PATENT DOCUMENTS

| | | | |
|---|---|---|---|
| 2002/0191161 A1* | 12/2002 | Baba | G03B 21/28 |
| | | | 353/98 |
| 2007/0035512 A1 | 2/2007 | Kim et al. | |
| 2009/0213350 A1 | 8/2009 | Sogard | |
| 2011/0037953 A1* | 2/2011 | Nizani | H04N 9/3173 |
| | | | 353/38 |
| 2015/0309323 A1* | 10/2015 | Park | G03B 21/14 |
| | | | 353/8 |
| 2016/0023665 A1* | 1/2016 | Sherony | G02B 27/01 |
| | | | 701/2 |
| 2016/0104827 A1* | 4/2016 | Hong | G02F 1/133603 |
| | | | 349/71 |
| 2016/0139408 A1 | 5/2016 | Yagi | |
| 2016/0218254 A1* | 7/2016 | Jacobson | H01L 25/0753 |
| 2017/0261746 A1* | 9/2017 | Tam | H04N 13/332 |
| 2017/0285343 A1 | 10/2017 | Belenkii et al. | |
| 2018/0052322 A1* | 2/2018 | Kubota | G02B 5/0221 |
| 2018/0335634 A1* | 11/2018 | Oliveira | G02B 27/0179 |
| 2018/0348524 A1 | 12/2018 | Blum et al. | |
| 2019/0101753 A1 | 4/2019 | Sasaki | |

FOREIGN PATENT DOCUMENTS

| | | | | |
|---|---|---|---|---|
| JP | 2004-126510 A | | 4/2004 | |
| JP | 2004126510 A | * | 4/2004 | ......... G02B 17/0642 |
| JP | 2011-81141 A | | 4/2011 | |
| JP | 2016-14861 A | | 1/2016 | |
| JP | 2016-132685 A | | 8/2018 | |
| JP | 2019-32363 A | | 2/2019 | |
| KR | 10-2007-0013498 A | | 1/2007 | |
| KR | 10-2019-0039453 A | | 4/2019 | |
| WO | 2018/124299 A1 | | 7/2018 | |

* cited by examiner

FIG. 8

|   | ASPHERICAL LENS | | SPHERICAL LENS | |
|---|---|---|---|---|
|   | R1 SURFACE | R2 SURFACE | R1 SURFACE | R2 SURFACE |
| c | 1.36E-02 | 0 | 5.20E-03 | 0 |
| k | 7.06E-01 | 0 | 0 | 0 |
| A | -2.32E-06 | 0 | 0 | 0 |
| B | 6.14E-10 | 0 | 0 | 0 |
| C | -2.20E-13 | 0 | 0 | 0 |
| D | -1.76E-17 | 0 | 0 | 0 |
| E | 0 | 0 | 0 | 0 |
| F | 0 | 0 | 0 | 0 |
| G | 0 | 0 | 0 | 0 |
| H | 0 | 0 | 0 | 0 |
| J | 0 | 0 | 0 | 0 |

FIG. 9

| COEFFICIENT | DEFINITION |
|---|---|
| $c$ | CURVATURE AT SURFACE VERTEX |
| $k$ | CONIC COEFFICIENT |
| $A$ | 4TH-ORDER DEFORMATION COEFFICIENT |
| $B$ | 6TH-ORDER DEFORMATION COEFFICIENT |
| $C$ | 8TH-ORDER DEFORMATION COEFFICIENT |
| $D$ | 10TH-ORDER DEFORMATION COEFFICIENT |
| $E$ | 12TH-ORDER DEFORMATION COEFFICIENT |
| $F$ | 14TH-ORDER DEFORMATION COEFFICIENT |
| $G$ | 16TH-ORDER DEFORMATION COEFFICIENT |
| $H$ | 18TH-ORDER DEFORMATION COEFFICIENT |
| $J$ | 20TH-ORDER DEFORMATION COEFFICIENT |

FIG. 10

| | FIRST FREE CURVED MIRROR | SECOND FREE CURVED MIRROR | THIRD FREE CURVED MIRROR |
|---|---|---|---|
| C | 0.00 | -679.50 | 0 |
| C1 | -102.83 | -0.74 | 0 |
| C2 | 0 | 0 | 0 |
| C3 | 0 | 0 | 0 |
| C4 | 2.51E-04 | 1.48E-03 | -7.11E-04 |
| C5 | 0 | 0 | 0 |
| C6 | 1.33E-04 | 1.25E-03 | -5.61E-04 |
| C7 | 0 | 0 | 0 |
| C8 | -8.63E-07 | 1.55E-06 | 4.78E-07 |
| C9 | 0 | 0 | 0 |
| C10 | -1.34E-07 | 1.77E-06 | 7.83E-07 |
| C11 | -2.18E-09 | 3.24E-09 | 3.48E-09 |
| C12 | 0 | 0 | 0 |
| C13 | 1.17E-08 | 5.08E-09 | 2.43E-09 |
| C14 | 0 | 0 | 0 |
| C15 | 1.14E-08 | 2.07E-09 | -1.22E-09 |
| C16 | 0 | 0 | 0 |
| C17 | 3.13E-10 | -2.67E-11 | -1.90E-11 |
| C18 | 0 | 0 | 0 |
| C19 | -4.09E-10 | -9.29E-11 | -5.07E-11 |
| C20 | 0 | 0 | 0 |
| C21 | -6.90E-11 | 2.52E-11 | 1.53E-11 |
| C22 | -8.48E-12 | -6.10E-13 | -3.55E-13 |
| C23 | 0 | 0 | 0 |
| C24 | -1.27E-11 | -6.22E-13 | -2.00E-13 |
| C25 | 0 | 0 | 0 |
| C26 | -3.95E-12 | -1.12E-12 | -1.33E-13 |
| C27 | 0 | 0 | 0 |
| C28 | -3.35E-12 | -1.39E-12 | -6.90E-13 |
| C29 | 0 | 0 | 0 |
| C30 | -5.40E-14 | -2.79E-16 | 3.41E-16 |
| C31 | 0 | 0 | 0 |
| C32 | 2.14E-13 | -4.64E-15 | -7.59E-16 |
| C33 | 0 | 0 | 0 |
| C34 | 6.00E-13 | 4.59E-14 | 1.72E-14 |
| C35 | 0 | 0 | 0 |
| C36 | -7.80E-14 | -8.73E-16 | 4.33E-15 |
| C37 | 1.30E-15 | 4.58E-17 | 2.74E-17 |
| C38 | 0 | 0 | 0 |
| C39 | 0 | 6.36E-18 | 9.59E-18 |
| C40 | 0 | 0 | 0 |
| C41 | 0 | 7.36E-17 | 4.69E-17 |
| C42 | 0 | 0 | 0 |
| C43 | 0 | 4.05E-16 | -2.32E-17 |

FIG. 11

| COEFFICIENT | DEFINITION |
|---|---|
| $c$ | SURFACE CURVATURE |
| C1 | CONIC CONSTANT |
| C2 | $x$ COEFFICIENT |
| C3 | $y$ COEFFICIENT |
| C4 | $x^2$ COEFFICIENT |
| C5 | $xy$ COEFFICIENT |
| C6 | $y^2$ COEFFICIENT |
| C7 | $x^3$ COEFFICIENT |
| C8 | $x^2 y$ COEFFICIENT |
| C9 | $xy^2$ COEFFICIENT |
| C10 | $y^3$ COEFFICIENT |
| C11 | $x^4$ COEFFICIENT |
| C12 | $x^3 y$ COEFFICIENT |
| C13 | $x^2 y^2$ COEFFICIENT |
| C14 | $xy^3$ COEFFICIENT |
| C15 | $y^4$ COEFFICIENT |
| C16 | $x^5$ COEFFICIENT |
| C17 | $x^4 y$ COEFFICIENT |
| C18 | $x^3 y^2$ COEFFICIENT |
| C19 | $x^2 y^3$ COEFFICIENT |
| C20 | $xy^4$ COEFFICIENT |
| C21 | $y^5$ COEFFICIENT |
| C22 | $x^6$ COEFFICIENT |
| C23 | $x^5 y$ COEFFICIENT |
| C24 | $x^4 y^2$ COEFFICIENT |
| C25 | $x^3 y^3$ COEFFICIENT |
| C26 | $x^2 y^4$ COEFFICIENT |
| C27 | $xy^5$ COEFFICIENT |
| C28 | $y^6$ COEFFICIENT |
| C29 | $x^7$ COEFFICIENT |
| C30 | $x^6 y$ COEFFICIENT |

FIG. 12

|  | COORDINATE | | | ECCENTRICITY | | |
|---|---|---|---|---|---|---|
|  | X | Y | Z | α | β | γ |
| POSITION OF USER'S EYE | 0 | 0 | 0 | 0 | 0 | 0 |
| IMAGE DISPLAY PANEL | 0 | 0 | 1000 | 0 | 0 | 0 |
| FIRST FREE CURVED MIRROR | 0 | 66.0 | 1032.4 | 147.1 | 0 | 0 |
| SECOND FREE CURVED MIRROR | 0 | -52.4 | 1085.6 | 88.2 | 0 | 0 |
| THIRD FREE CURVED MIRROR | 0 | 0 | 1113.1 | 31.1 | 0 | 0 |
| ASPHERICAL LENS | 0 | 66.0 | 1095.6 | -180 | 0 | 0 |
| SPHERICAL LENS | 0 | 66.0 | 1118.6 | -180 | 0 | 0 |
| DIFFUSER | 0 | 66.0 | 1139.5 | -180 | 0 | 0 |

FIG. 13

| | COORDINATE | | | ECCENTRICITY | | |
|---|---|---|---|---|---|---|
| | X | Y | Z | α | β | γ |
| POSITION OF USER'S EYE | 0 | 0 | 0 | 0 | 0 | 0 |
| IMAGE DISPLAY PANEL | 0 | 0 | 900 | 0 | 0 | 0 |
| FIRST FREE CURVED MIRROR | 0 | 66.0 | 932.4 | 147.1 | 0 | 0 |
| SECOND FREE CURVED MIRROR | 0 | -52.4 | 985.6 | 88.2 | 0 | 0 |
| THIRD FREE CURVED MIRROR | 0 | 0 | 1013.1 | 31.1 | 0 | 0 |
| ASPHERICAL LENS | 0 | 66.0 | 1002.5 | -180 | 0 | 0 |
| SPHERICAL LENS | 0 | 66.0 | 1026.5 | -180 | 0 | 0 |
| DIFFUSER | 0 | 66.0 | 1046.4 | -180 | 0 | 0 |

FIG. 14

| | COORDINATE | | | ECCENTRICITY | | |
|---|---|---|---|---|---|---|
| | X | Y | Z | α | β | γ |
| POSITION OF USER'S EYE | 0 | 0 | 0 | 0 | 0 | 0 |
| IMAGE DISPLAY PANEL | 0 | 0 | 1100 | 32.4 | 0 | 0 |
| FIRST FREE CURVED MIRROR | 0 | 66.0 | 1182.4 | 147.1 | 0 | 0 |
| SECOND FREE CURVED MIRROR | 0 | -52.4 | 1185.6 | 88.2 | 0 | 0 |
| THIRD FREE CURVED MIRROR | 0 | 0 | 1213.1 | 31.1 | 0 | 0 |
| ASPHERICAL LENS | 0 | 66.0 | 1190.0 | -180 | 0 | 0 |
| SPHERICAL LENS | 0 | 66.0 | 1213.9 | -180 | 0 | 0 |
| DIFFUSER | 0 | 66.0 | 1233.9 | -180 | 0 | 0 |

IMAGE DISPLAY APPARATUS

CROSS-REFERENCE TO RELATED APPLICATIONS

This application claims priority from Japanese Patent Application No. 2019-062832, filed on Mar. 28, 2019, in the Japanese Patent Office and Korean Patent Application No. 10-2019-0121727, filed on Oct. 1, 2019, in the Korean Intellectual Property Office, the disclosures of which are herein incorporated by reference in their entireties.

BACKGROUND

1. Field

Example embodiments of the present disclosure relate to image display apparatuses.

2. Description of the Related Art

In general, an optical system of an image display apparatus is configured to use a plurality of reflectors. For example, a head-up display apparatus may be configured to guide the light output from a projector to a projection point of a windshield through a first reflector, a second reflector, a folding mirror, and a concave mirror. A size of the head-up display apparatus may increase because the light output from a projector follows a zigzag-folded light path.

SUMMARY

One or more example embodiment provide compact or miniature image display apparatuses.

According to an aspect of an example embodiment, there is provided an image display apparatus including a first light source, a spherical lens configured to receive light output from the first light source, an aspherical lens configured to receive light output from the spherical lens, a first free curved mirror configured to receive light output from the aspherical lens is incident, a second free curved mirror configured to receive light output from the first free curved mirror, a third free curved mirror configured to receive light output from the second free curved mirror, and an image display panel configured to receive light output from the third free curved mirror and configured to display image information, wherein a first light path of the light output from the first free curved mirror to the second free curved mirror, a second light path of the light output from the second free curved mirror to the third free curved mirror, and a third light path of the light output from the third free curved mirror to the image display panel intersect each other.

The image display apparatus may further include a diffuser configured to output diffused light to the spherical lens.

The image display apparatus may further include a first scanner configured to receive the light output from the first light source and configured to scan the light output from the first light source to focus the light output from the first light source on an eye of a user based on a detected position of the eye of the user, and a parabolic mirror configured to receive light output from the first scanner and configured to output the light output from the first scanner in a direction that is perpendicular to a light incidence surface of the diffuser.

The image display apparatus may further include a first reducer provided between the diffuser and the parabolic mirror, and configured to reduce speckles included in an image formed through the image display panel.

The first reducer may include a first diffuser.

The first diffuser may be rotatable.

The image display apparatus may further include a second reducer provided between the first light source and the first scanner, and configured to reduce speckles included in an image formed through the image display panel.

The second reducer may include a first collimating lens, a second diffuser, a driver, and a second collimating lens.

The spherical lens, the aspherical lens, and the diffuser may be configured to move in a direction of a light path of light passing through the spherical lens, the aspherical lens, and the diffuser to focus the light passing through the spherical lens, the aspherical lens, and the diffuser on an eye of a user based on a detected position of the eye of the user.

The image display apparatus may further include a second light source, and a beam splitter configured to receive light output from the first light source and light output from the second light source, and configured to output the light output from the first light source and the light output from the second light source such that a light path of the light output from the first light source is on same light path as a light path of the light output from the second light source.

The image display apparatus may further include a second scanner configured to receive light output from the second light source, and configured to scan the light output from the second light source to focus the light output from the second light source on an eye of a user based on a detected position of the eye of the user.

The image display apparatus may further include a third reducer provided between the second light source and the second scanner, and configured to reduce speckles included in an image formed through the image display panel.

The image display apparatus may further include a polymer dispersed liquid crystal panel provided on a light incidence surface of the image display panel, and a third light source configured to output light to the polymer dispersed liquid crystal panel.

The polymer dispersed liquid crystal panel may be configured to transmit light based on holographic image information or three-dimensional image information being displayed on the image display panel, and the polymer dispersed liquid crystal panel may be configured to disperse light to output light from the third light source based on two-dimensional image information being displayed on the image display panel.

The diffuser ay include a remote phosphor and a quantum dot sheet.

A light incident surface of the aspherical lens may be a convex surface and configured to output light received from the spherical lens to the first free curved mirror.

The image display apparatus may further include a second reducer provided between the first light source and the first scanner.

The image display apparatus may further include a second light source, a beam splitter configured to receive light output from the first light source and light output from the second light source, and configured to output the light output from the first light source and the light output from the second light source, and a second scanner configured to receive light output from the second light source, and configured to scan the light output from the second light source to focus the light output from the second light source on an eye of the user based on a detected position of the eye of the user.

The image display apparatus may further include a third reducer provided between the second light source and the second scanner.

The image display apparatus may further include a polymer dispersed liquid crystal panel provided on a light incidence surface of the image display panel, and a third light source configured to output light to the polymer dispersed liquid crystal panel.

BRIEF DESCRIPTION OF THE DRAWINGS

The above and/or other aspects, features, and advantages of example embodiments will be more apparent from the following description taken in conjunction with the accompanying drawings, in which:

FIG. 8 is a table describing the shape of a spherical lens and an aspherical lens of an image display apparatus according to an example embodiment;

FIG. 9 is a table describing the coefficients of a spherical lens and an aspherical lens of an image display apparatus according to an example embodiment;

FIG. 10 is a table describing the shape of a first free curved mirror, a second free curved mirror, and a third free curved mirror of an image display apparatus according to an example embodiment;

FIG. 11 is a table describing the coefficients of FIG. 10;

FIG. 12 is a table describing the position of a diffuser, a spherical lens, an aspherical lens, a first free curved mirror, a second free curved mirror, and a third free curved mirror of an image display apparatus according to an example embodiment;

FIG. 13 a table describing the position of a diffuser, a spherical lens, an aspherical lens, a first free curved mirror, a second free curved mirror, and a third free curved mirror of an image display apparatus according to an example embodiment as illustrated in FIG. 1 when the user's eye has moved to the side surface of the image display apparatus in comparison with the example embodiment as illustrated in FIG. 12;

FIG. 14 a table describing the position of the diffuser, the spherical lens, the aspherical lens, the first free curved mirror, the second free curved mirror, and the third free curved mirror of the image display apparatus according to an example embodiment as illustrated in FIG. 1 when the user's eye has moved to the opposite side with respect to the side surface of the image display apparatus in comparison with the example embodiment as illustrated in FIG. 12;

DETAILED DESCRIPTION

Figure 1:
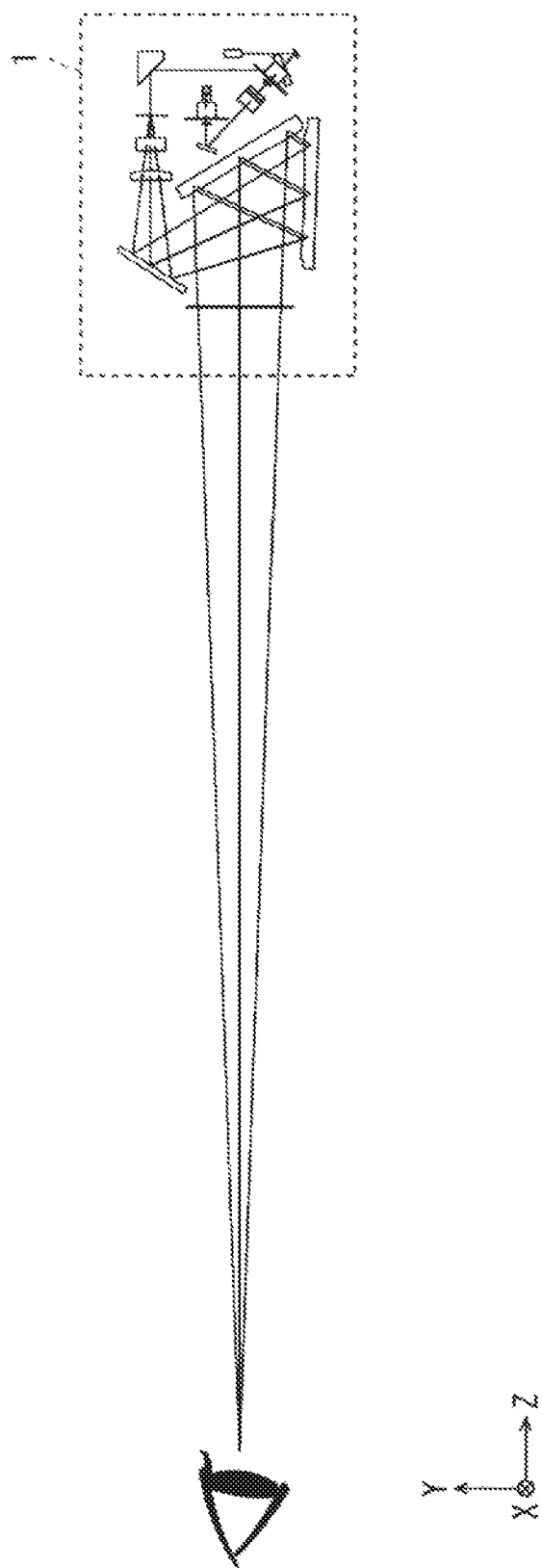
FIG. 1 is a diagram illustrating the configuration of an image display apparatus according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, image display apparatuses according to example embodiments will be described in detail with reference to the accompanying drawings. However, the present disclosure is not limited to the following example embodiments. Also, the following descriptions and drawings are suitably simplified for clarity of description.

Figure 2:
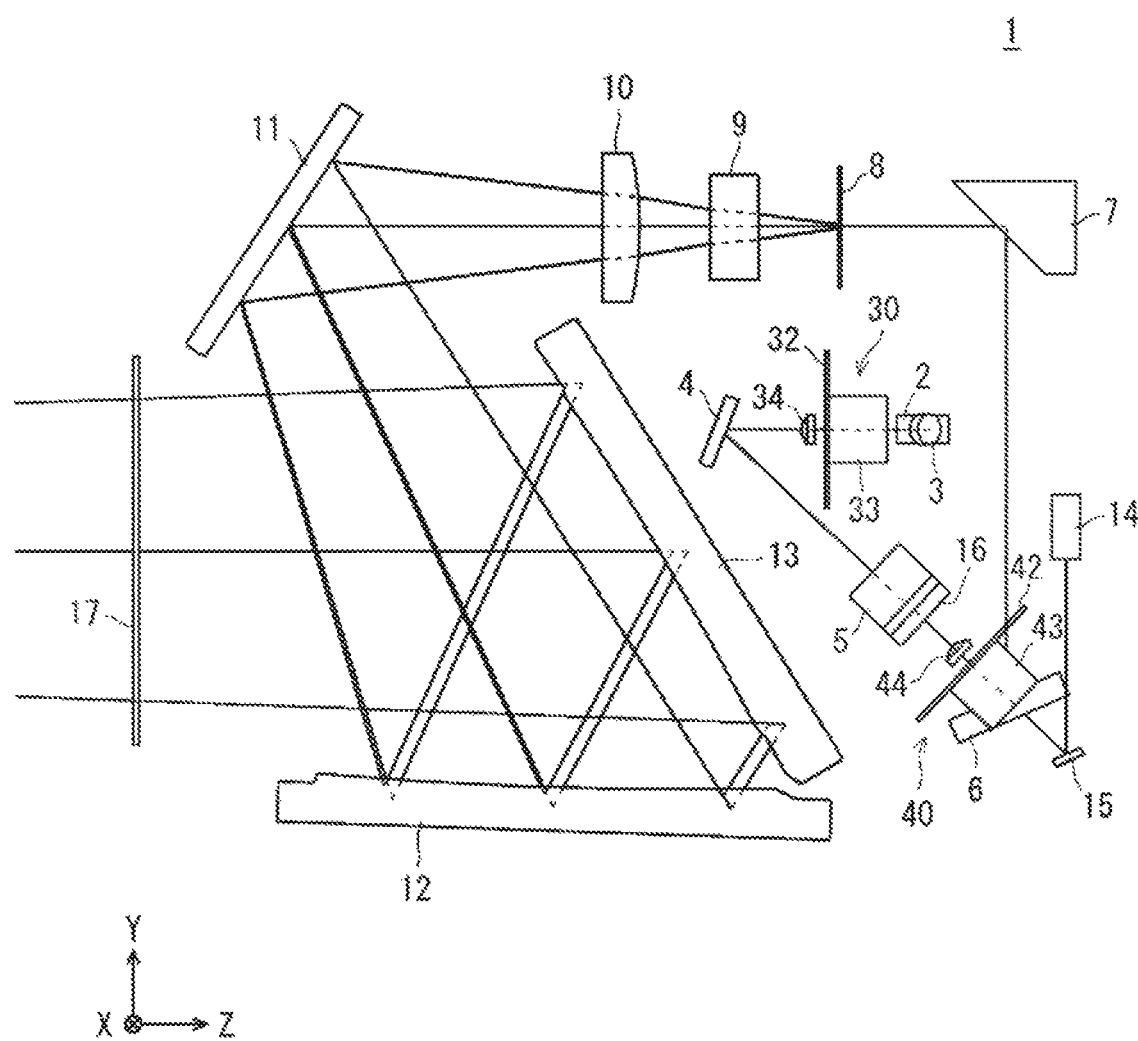
FIG. 2 is a diagram schematically illustrating the arrangement of each element of an image display apparatus according to an example embodiment.
Figure 3:
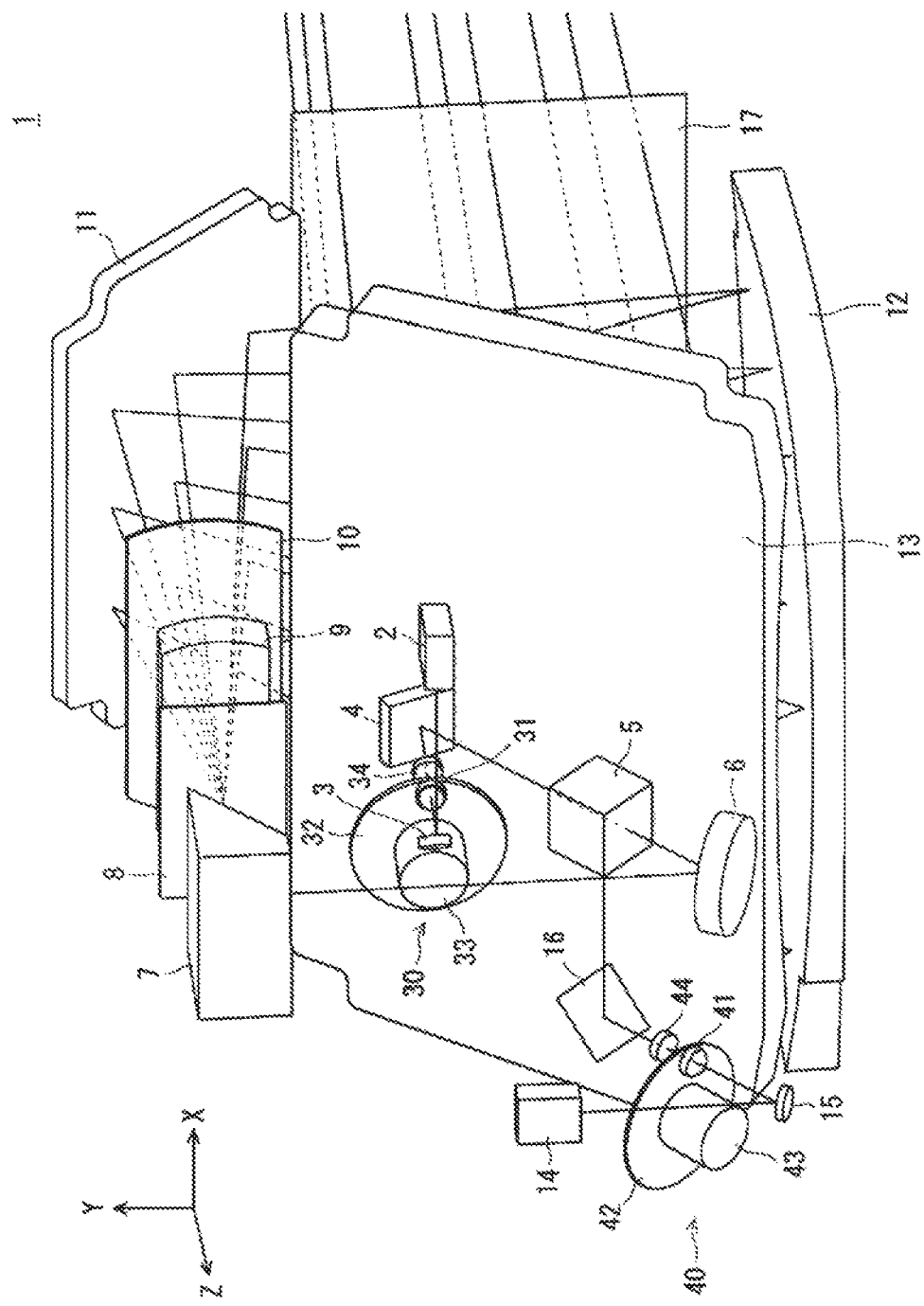
FIG. 3 is another diagram schematically illustrating the arrangement of each element of an image display apparatus according to an example embodiment.

A basic configuration of an image display apparatus according to an example embodiment will be described below. FIG. 1 is a schematic diagram of an image display apparatus according to an example embodiment. FIG. 2 is a diagram schematically illustrating the arrangement of each element of an image display apparatus according to an example embodiment. FIG. 3 is another diagram schematically illustrating the arrangement of each element of an image display apparatus according to an example embodiment. Also, for clarity of description, the following descriptions will be made using a three-dimensional (3D) coordinate system (XYZ).

As illustrated in FIG. 1, an image display apparatus 1 may emit light focused on the position of an eye of a user and output light to form a high quality image at the position of the eye. As illustrated in FIGS. 2 and 3, the image display apparatus 1 may include a first light source 2, a spherical lens 9, an aspherical lens 10, a first free curved mirror 11, a second free curved mirror 12, and a third free curved mirror 13. Also, the image display apparatus 1 may include a first reflection mirror 3, a first scanner 4, a beam splitter 5, a second reflection mirror 6, a parabolic mirror 7, a diffuser 8, a second light source 14, a third reflection mirror 15, a second scanner 16, and an image display panel 17. These elements may be mounted on a case.

The first light source 2 may be a white light source. The first light source 2 may be, for example, a laser light source and may output red, green, and blue (RGB) laser light along the X axis. The first reflection mirror 3 may output the light output from the first light source 2 to the first scanner 4. The first reflection mirror 3 may be arranged, for example, at the −X-axis side with respect to the first light source 2 and may output the light output from the first light source 2 in the −Z-axis direction.

The first scanner 4 may scan and output the light received from the first reflection mirror 3 to the beam splitter 5. The first scanner 4 may include, for example, a micro electro mechanical system (MEMS) mirror. Also, the first scanner 4 may be arranged at the −Z-axis side with respect to the first reflection mirror 3 and may output the light received from the first reflection mirror 3, in the diagonal direction between the −Y-axis direction and +Z-axis direction.

The first scanner 4 may be rotatably driven in two directions of the X axis and the Y axis and may control the incidence position of light incident on the diffuser 8 through the parabolic mirror 7 or the like according to the XYZ position of one of the left or right eye of the user detected by a sensor, such that a relatively high quality image may be formed at the position of one eye of the user. The first scanner 4 may have any configuration capable of scanning light and may be configured variously.

The beam splitter 5 may output the light received from the first scanner 4 to the second reflection mirror 6. The beam splitter 5 may be arranged, for example, in a diagonal side between the −Y-axis side and the +Z-axis side with respect to the first scanner 4 and may output the light received from the first scanner 4 without bending the light.

The second reflection mirror 6 may output the light received from the beam splitter 5 to the parabolic mirror 7. The second reflection mirror 6 may be arranged, for example, in a diagonal side between the −Y-axis side and the +Z-axis side with respect to the beam splitter 5 and may output the light input from the beam splitter 5 in a +Y-axis direction to the parabolic mirror 7. The beam splitter 5 may be arranged between the first scanner 4 and the second reflection mirror 6.

The parabolic mirror 7 may output the light received from the second reflection mirror 6 perpendicularly in a −Z-axis direction to the light incidence surface of the diffuser 8. The parabolic mirror 7 may be arranged, for example, at the +Y-axis side with respect to the second reflection mirror 6 and may output the light received from the second reflection mirror 6 in the −Z-axis direction.

The diffuser 8 may diffuse the light received from the parabolic mirror 7 to be irradiated onto the entire display region of the image display panel 17 and may output the diffused light to the spherical lens 9 in the −Z-axis direction. The diffuser 8 may include, for example, a diffractive optical element and a diffusion plate and may operate as a beam shaper for diffusing the light received from the parabolic mirror 7, in a substantially rectangular shape to be irradiated onto the entire display region of the image display panel 17.

The diffuser 8 may be arranged at the −Z-axis side with respect to the parabolic mirror 7 and may output the light received from the parabolic mirror 7 in the −Z-axis direction. However, the diffuser 8 may diffuse the light input from the parabolic mirror 7 to be irradiated onto the entire display region of the image display panel 17.

The spherical lens 9 may have a concave surface at the light output surface of the spherical lens 9 that faces the aspherical lens 10 and may output the light received from the diffuser 8 to the aspherical lens 10 in the −Z-axis direction. The spherical lens 9 may be arranged, for example, at the −Z-axis side with respect to the diffuser 8 and may output the light received from the diffuser 8 in the −Z-axis direction.

The aspherical lens 10 may have a convex surface at the light incidence surface of the aspherical lens 10 that faces the spherical lens 9 and may output the light received from the spherical lens 9 to the first free curved mirror 11 in a −Z-axis direction. The aspherical lens 10 may be arranged, for example, at the −Z-axis side with respect to the spherical lens 9 and may output the light received from the spherical lens 9 in the −Z-axis direction. The detailed arrangement and shape of the spherical lens 9 and the aspherical lens 10 will be described below.

The first free curved mirror 11 may output the light received from the aspherical lens 10 to the second free curved mirror 12 in a diagonal direction between the −Y-axis direction and +Z-axis direction. The first free curved mirror 11 may be arranged, for example, at the −Z-axis side with respect to the aspherical lens 10 and the reflection surface of the first free curved mirror 11 may substantially face a the diagonal direction between the −Y-axis direction and the +Z-axis direction.

The diffuser 8, the spherical lens 9, and the aspherical lens 10 may be arranged between the parabolic mirror 7 and the first free curved mirror 11. The first free curved mirror 11 may output the light received from the aspherical lens 10, for example, in the diagonal direction between the −Y-axis direction and the +Z-axis direction.

The second free curved mirror 12 may output the light received from the first free curved mirror 11 to the third free curved mirror 13. The second free curved mirror 12 may be arranged, for example, at the −Y-axis side with respect to the first free curved mirror 11 and the reflection surface of the second free curved mirror 12 may substantially face the +Y-axis direction. Also, the second free curved mirror 12 may output the light received from the first free curved mirror 11, for example, in the diagonal direction between the +Y-axis direction and the +Z-axis direction.

The third free curved mirror 13 may output the light received from the second free curved mirror 12 to the image display panel 17. The third free curved mirror 13 may be arranged, for example, at the +Y-axis side with respect to the second free curved mirror 12 and the reflection surface of the third free curved mirror 13 may substantially face a diagonal direction between the −Y-axis direction and the −Z-axis direction. Also, the third free curved mirror 13 may output the light received from the second free curved mirror 12, for example, in the −Z-axis direction.

The first free curved mirror 11, the second free curved mirror 12, and the third free curved mirror 13 may be a concave mirror, a converging mirror, or the like. The first free curved mirror 11, the second free curved mirror 12, and the third free curved mirror 13 may be configured to focus the light on the position of the eye of the user. As illustrated in FIG. 2, the first free curved mirror 11, the second free curved mirror 12, and the third free curved mirror 13 may be arranged such that the light path of the light output from the first free curved mirror 11, the light path of the light output from the second free curved mirror 12, and the light path of the light output from the third free curved mirror 13 may overlap each other such that the light paths may be folded, intersect, or exhibit internal reflection with respect to each other. The detailed arrangement and shape of the first free curved mirror 11, the second free curved mirror 12, and the third free curved mirror 13 will be described below.

The second light source 14 may be, for example, a white light source. The second light source 14 may be, for example, a laser light source and may output RGB laser light in the −Y-axis direction. The third reflection mirror 15 may output the light received from the second light source 14 to the second scanner 16. The third reflection mirror 15 may be arranged, for example, at the −Y-axis side with respect to the second light source 14 and may output the light received from the second light source 14, in the diagonal direction between the +Y-axis direction and the −Z-axis direction.

The second scanner 16 may scan and output the light received from the third reflection mirror 15 to the beam splitter 5. The second scanner 16 may include, for example, a MEMS mirror.

The second scanner 16 may be arranged in a diagonal side between the +Y-axis side and the −Z-axis side with respect to the third reflection mirror 15 and may output the light received from the third reflection mirror 15 to the +X-axis side.

The second scanner 16 may be rotatably driven in two directions of the X axis and the Y axis and may control the incidence position of light incident on the diffuser 8 through the parabolic mirror 7 or the like according to the position of the other of the left or right eye of the user detected by a sensor, such that a high quality image may be formed at the position of the other eye of the user. The second scanner 16 may have any configuration capable of scanning light.

The beam splitter 5 may bend the light received from the second scanner 16 to arrange the light received from the first scanner 4 and the light received from the second scanner 16 on the same light path, and output the resulting light to the parabolic mirror 7.

The image display panel 17 may display image information. The image display panel 17 may be, for example, a liquid crystal display (LCD) panel that displays holographic image information and three-dimensional (3D) image information. In order to display holographic image information, the image display panel 17 may simultaneously display image information for the right eye and image information for the left eye. In order to display 3D image information, the image display panel 17 may display image information for the right eye and image information for the left eye alternately at preset periods. However, embodiments are not limited thereto. For example, the image display panel 17 may display two-dimensional (2D) image information.

The image display apparatus 1 may form a high quality image at one eye of the user through the image display panel 17 by the light output from the first light source 2 and may form a high quality image at the other eye of the user through the image display panel 17 by the light output from the second light source 14. Thus, when holographic image information and 3D image information are displayed as image information on the image display panel 17, the user may recognize a 3D shape.

As described above, in the image display apparatus 1, the first free curved mirror 11, the second free curved mirror 12, and the third free curved mirror 13 may be arranged such that the light path of the light output from the first free curved mirror 11, the light path of the light output from the second free curved mirror 12, and the light path of the light output from the third free curved mirror 13 may overlap each other. For example, the light path of the light output from the first free curved mirror 11, the light path of the light output from the second free curved mirror 12, and the light path of the light output from the third free curved mirror 13 may intersect each other. Thus, a size of the image display apparatus 1 may be reduced or miniaturized in comparison with the related head-up display apparatus.

The first light source 2, the first reflection mirror 3, the first scanner 4, the beam splitter 5, the second reflection mirror 6, the second light source 14, the third reflection mirror 15, and the second scanner 16 may be arranged in a space at the +Z-axis side with respect to the third free curved mirror 13. Also, the spherical lens 9 and the aspherical lens 10 may be arranged in a space at the +Y-axis side with respect to the third free curved mirror 13. Thus, a dead space in the case of the image display apparatus 1 may be more efficiently utilized and the image display apparatus 1 may be reduced or miniaturized.

Here, when a laser light source is used as the first light source 2 and the second light source 14, because laser light is coherent light, speckles may occur in an image formed through the image display panel 17.

Figure 4:
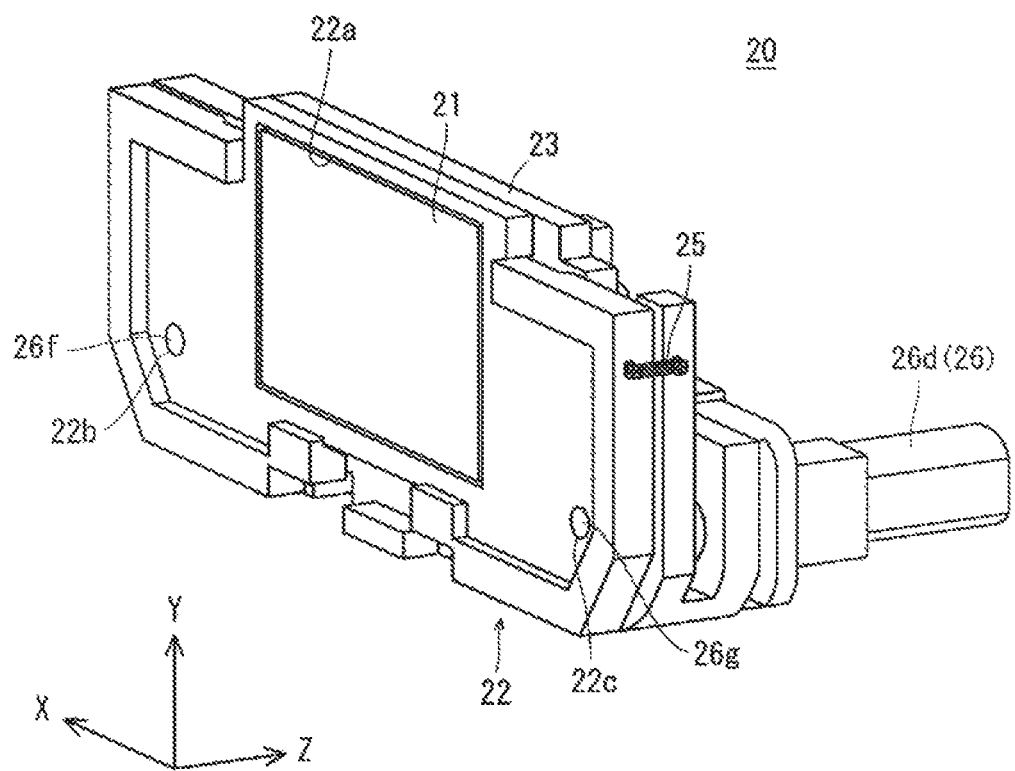
FIG. 4 is a perspective view illustrating a first reducer of an image display apparatus according to an example embodiment.
Figure 5:
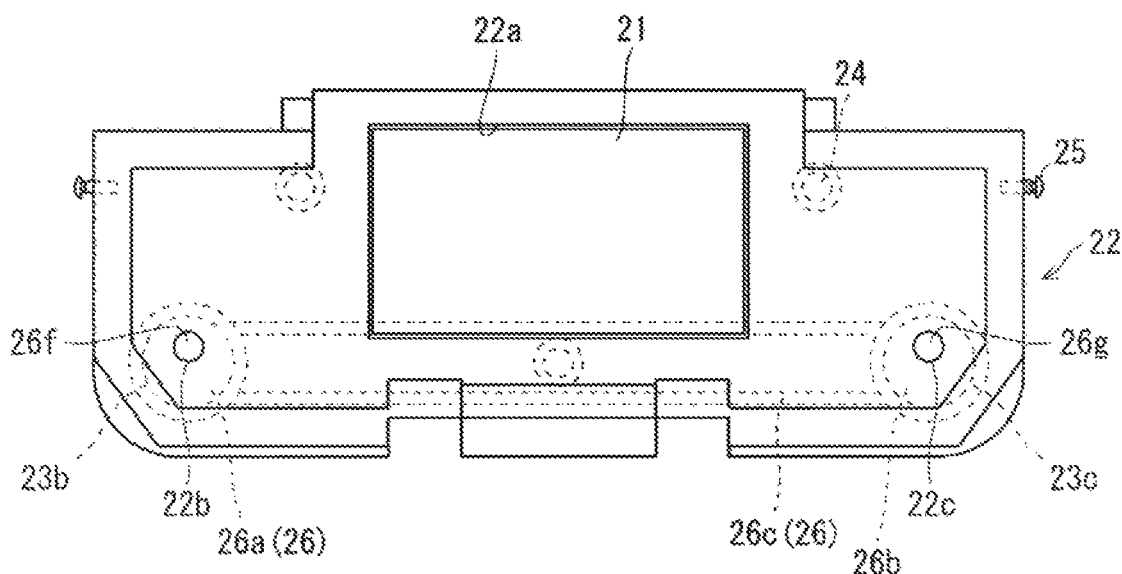
FIG. 5 is a front view illustrating a first reducer of an image display apparatus according to an example embodiment.
Figure 6:
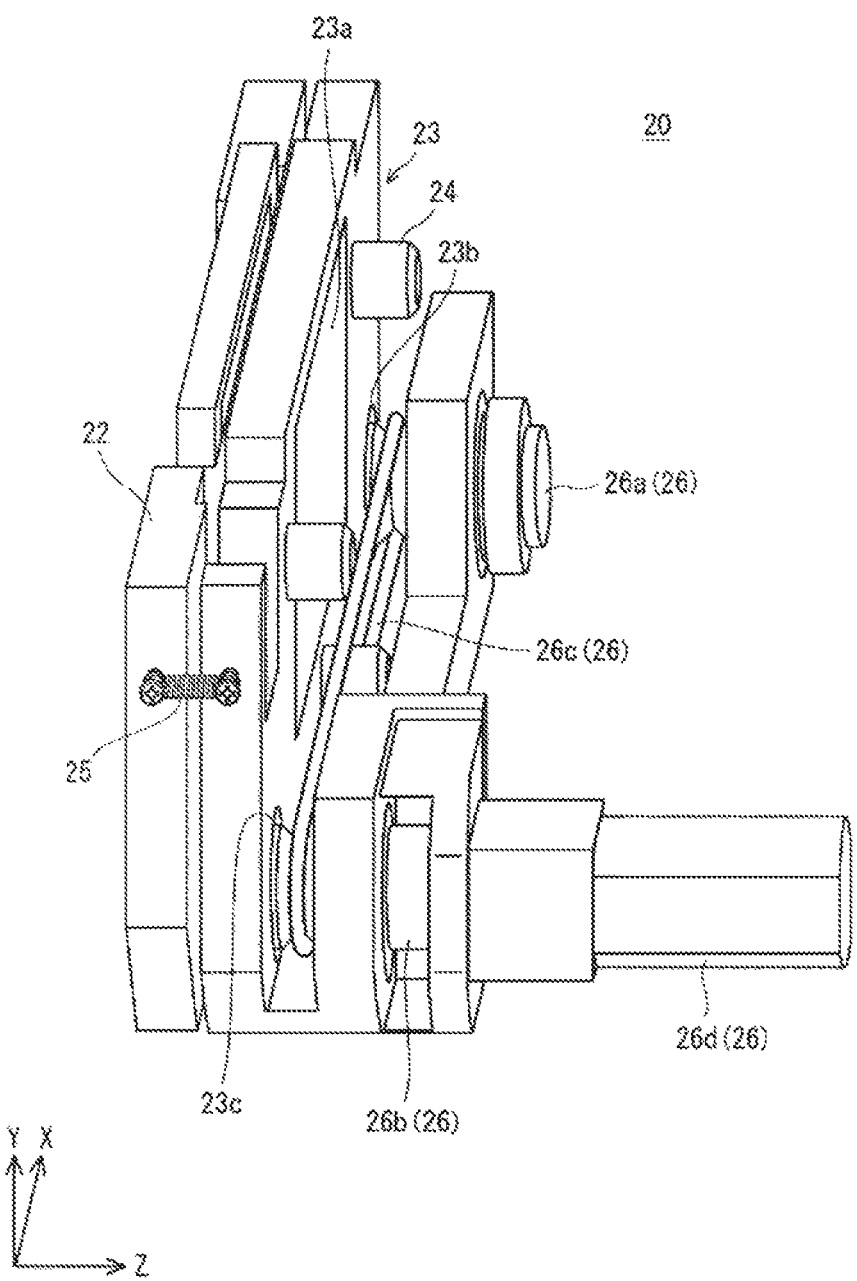
FIG. 6 is another perspective view illustrating a first reducer of an image display apparatus according to an example embodiment.
Figure 7:
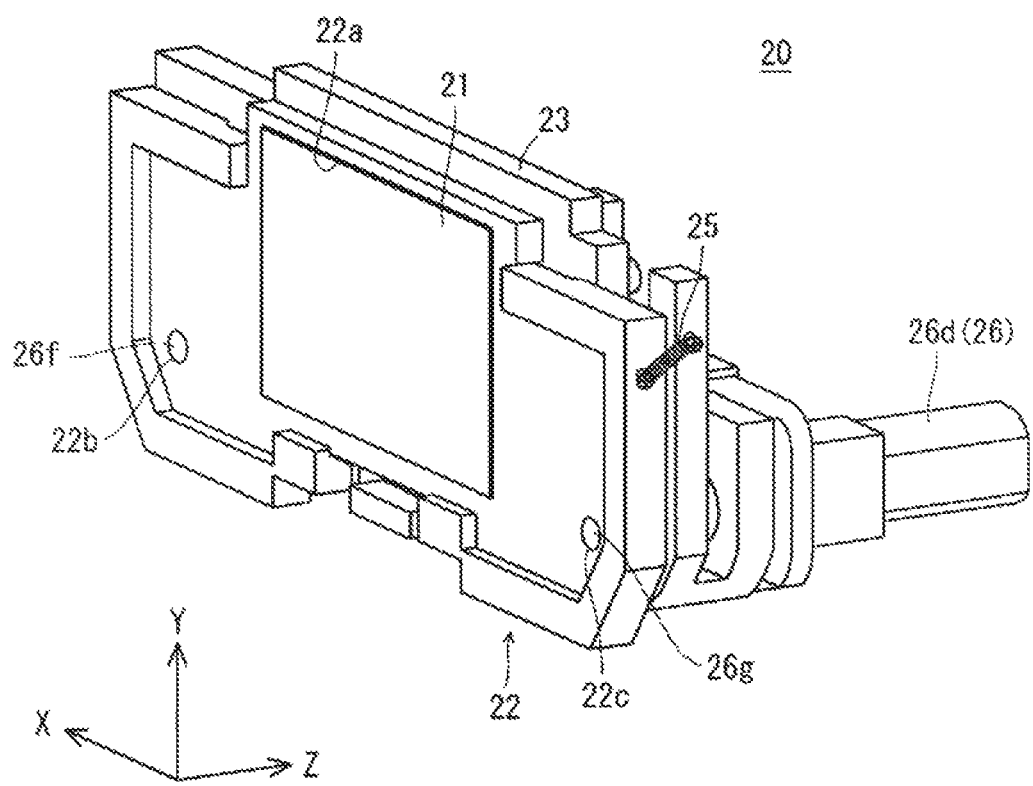
FIG. 7 is a perspective view illustrating a state in which a diffuser of a first reducer of an image display apparatus according to an example embodiment is rotated.

Thus, a first reducer may be provided between the parabolic mirror 7 and the diffuser 8. FIG. 4 is a perspective view illustrating the first reducer 20 of the example embodiment. FIG. 5 is a front view illustrating the first reducer 20 of the example embodiment. FIG. 6 is another perspective view illustrating the first reducer 20 of the example embodiment. FIG. 7 is a perspective view illustrating a state in which a diffuser 21 of the first reducer 20 of the example embodiment is rotated.

As illustrated in FIGS. 4, 5, and 6, the first reducer 20 may include a diffuser 21, a first frame 22, a second frame 23, a ball bearing 24, an elastic body 25, and a driver 26. The diffuser 21 may include a diffusion plate and may have, for example, a rectangular shape.

The first frame 22 may include an opening portion 22a, a first through hole 22b, and a second through hole 22c. The opening portion 22a may be, for example, rectangular and the diffuser 21 may be fixed into the opening portion 22a.

The first through hole 22b and the second through hole 22c may be substantially circular when viewed in the Z-axis direction. The first through hole 22b and the second through hole 22c may be arranged at substantially the same height in the Y-axis direction and may be spaced apart from each other in the X-axis direction.

For example, as illustrated in FIG. 5, when the first frame 22 has a substantially rectangular shape when viewed in the Z-axis direction, the first through hole 22b may be arranged at an edge portion of the +X-axis side and −Y-axis side of the first frame 22 and the second through hole 22c may be arranged at an edge portion of the −X-axis side and the −Y-axis side of the first frame 22.

The second frame 23 may be arranged at the +Z-axis side with respect to the first frame 22. The second frame 23 may include an opening portion 23a, a first through hole 23b, and a second through hole 23c. The opening portion 23a may have, for example, a rectangular shape to correspond to the opening portion 22a of the first frame 22 and may substantially overlap the opening portion 22a of the first frame 22 in the Z-axis direction.

The first through hole 23b and the second through hole 23c may be substantially circular when viewed in the Z-axis direction. The first through hole 23b and the second through hole 23c may be arranged at substantially the same height in the Y-axis direction and may be spaced apart from each other in the X-axis direction.

For example, as illustrated in FIG. 6, when the second frame 23 has a substantially rectangular shape when viewed in the Z-axis direction, the first through hole 23b may be arranged at an edge portion of the +X-axis side and −Y-axis side of the second frame 23 and the second through hole 23c may be arranged at an edge portion of the −X-axis side and the −Y-axis side of the second frame 23.

The ball bearing 24 may have a structure in which a ball is rotatably retained by a retainer and may protrude from the tip end of the retainer in a state where the ball is pressed. Also, the ball bearing 24 may be fixed to the second frame 23 in a state where the ball contacts the +Z-axis side of the first frame 22. Thus, the first frame 22 may be movable with respect to the second frame 23 on the XY plane.

The ball bearing 24 may be arranged around the opening portion 23a of the second frame 23. For example, the ball bearing 24 may be arranged at both sides of the X-axis direction and the −Y-axis side of the opening portion 23a of the second frame 23 with the opening portion 23a therebetween. However, if only the first frame 22 may be moved with respect to the second frame 23 on the XY plane, a ball bearing may not be used and for example, a sliding bearing may be used. Also, the arrangement of the ball bearings 24 is not limited thereto.

The elastic body 25 may connect the first frame 22 and the second frame 23 to press the +Z-axis side surface of the first frame 22 with respect to the ball of the ball bearing 24. The elastic body 25 may be, for example, a coil spring and may be arranged to pass a gap between the first frame 22 and the second frame 23.

The driver 26 may rotate the first frame 22. The driver 26 may include a first rotation shaft 26a, a second rotation shaft 26b, a belt 26c, and a motor 26d. The first rotation shaft 26a may have a cylindrical shape. Also, the first rotation shaft 26a may extend in the Z-axis direction and may rotatably pass through the first through hole 23b of the second frame 23.

At a −Z-axis side surface of the first rotation shaft 26a, a pin 26f may be installed to protrude in the Z-axis direction from the −Z-axis side surface. The pin 26f may be arranged at a position eccentric to the central axis of the first rotation shaft 26a. Also, a tip end portion of the pin 26f may rotatably pass through the first through hole 22b of the first frame 22.

The second rotation shaft 26b may have the same configuration as the first rotation shaft 26a. For example, the second rotation shaft 26b may rotatably pass through the second through hole 23c of the second frame 23. Also, at the −Z-axis side surface of the second rotation shaft 26b, a tip end portion of a pin 26g may rotatably pass through the second through hole 22c of the first frame 22.

The position relationship between the pin 26f of the first rotation shaft 26a and the central axis of the first rotation shaft 26a and the XY plane may be the same as the position relationship between the pin 26g of the second rotation shaft 26b and the central axis of the second rotation shaft 26b and the XY plane.

The belt 26c may be an endless belt and may be hung on the first rotation shaft 26a and the second rotation shaft 26b. Thus, the central axis of the first rotation shaft 26a, the pin 26f of the first rotation shaft 26a, the central axis of the second rotation shaft 26b, the pin 26g of the second rotation shaft 26b, and the belt 26c may form a parallel link mechanism.

The motor 26d may be connected to an end portion on the +Z-axis side of the second rotation shaft 26b that may transmit a rotational driving force of the motor 26d to the second rotation shaft 26b. However, the motor 26d may be connected to an end portion on the +Z-axis side of the first rotation shaft 26a.

When the motor 26d is rotatably driven in the first reducer 20, the second rotation shaft 26b may rotate and simultaneously the first rotation shaft 26a may rotate through the belt 26c in synchronization with the second rotation shaft 26b.

As described above, because the central axis of the first rotation shaft 26a, the pin 26f of the first rotation shaft 26a, the central axis of the second rotation shaft 26b, the pin 26g of the second rotation shaft 26b, and the belt 26c are arranged to form a parallel link mechanism, when the first rotation shaft 26a and the second rotation shaft 26b rotate, the diffuser 21 may be rotated with respect to the second frame 23. As a result, as illustrated in FIG. 7, the position of the diffuser 21 may be changed with respect to the second frame 23.

By rotating the diffuser 21, coherent light may be converted into incoherent light, and thus speckle occurrence may be reduced or suppressed. Because the diffuser 21 is rotated, the concentration of energy of light at one point of the diffuser 21 may be reduced or suppressed, and thus damage to the diffuser 21 may be reduced or suppressed.

Also, when speckles are not fully suppressed even when using the first reducer 20, a second reducer 30 may be arranged between the first light source 2 and the first scanner 4, and a third reducer 40 may be arranged between the second light source 14 and the second scanner 16.

As illustrated in FIG. 3, the second reducer 30 may be arranged between the first reflection mirror 3 and the first scanner 4. The second reducer 30 may include a first collimating lens 31, a diffuser 32, a driver 33, and a second collimating lens 34.

The first collimating lens 31 may receive light output from the first reflection mirror 3, convert the light into parallel light, and output the parallel light to the diffuser 32. The diffuser 32 may include, for example, a circular diffusion plate and may diffuse the light received from the first collimating lens 31 and output the diffused light to the second collimating lens 34.

The driver 33 may rotate the diffuser 32 in the direction of the center of the diffuser 32. The driver 33 may include a motor or the like, and an output shaft of the motor may be connected to the center of the diffuser 32 to transmit the rotational driving force of the driver 33 to the diffuser 32.

The second collimating lens 34 may collect the light received from the diffuser 32 and output the collected light to the first scanner 4. When the diffuser 32 is rotated in the reducer 30, coherent light may be converted into incoherent light and thus speckle occurrence may be reduced or suppressed. Also, because the diffuser 32 is rotated, the concentration of energy of light at one point of the diffuser 32 may be reduced suppressed, and thus damage to the diffuser 32 may be reduced or suppressed.

As illustrated in FIG. 3, the third reducer 40 may be arranged between the third reflection mirror 15 and the second scanner 16. The third reducer 40 may have substantially the same configuration as the second reducer 30. For example, similar to the second reducer 30, the third reducer 40 may include a first collimating lens 41, a diffuser 42, a driver 43, and a second collimating lens 44.

Also in the third reducer 40, when the diffuser 42 is rotated, coherent light may be converted into incoherent light, and thus speckle occurrence may be reduced or suppressed. Also, because the diffuser 42 is rotated, the concentration of energy of light at one point of the diffuser 42 may be reduced or suppressed, and thus damage to the diffuser 42 may be reduced or suppressed.

Next, the shape of the spherical lens 9 and the aspherical lens 10 will be described below. FIG. 8 is a table describing the shape of a spherical lens and an aspherical lens of an image display apparatus according to the example embodiment. FIG. 9 is a table describing aspherical coefficients. The R1 surface of the aspherical lens of FIG. 8 is a light incidence surface, and the R2 surface of the aspherical lens of FIG. 8 is a light output surface. Also, the R1 surface of the spherical lens of FIG. 8 is a light output surface, and the R2 surface of the spherical lens of FIG. 8 is a light incidence surface.

The spherical lens 9 and the aspherical lens 10 may have, for example, the shape described in FIG. 8. The shape of the aspherical lens 10 may be defined by Equation 1 below. Here, z is the SAG amount of a surface parallel to the Z axis.

$$z = \frac{cr^2}{1 + \sqrt{1 - (1+k)c^2 r^2}} + Ar^4 + Br^6 + Cr^8 + Dr^{10} + Er^{12} + Fr^{14} + Gr^{16} + Hr^{18} + Jr^{20} \qquad \langle\text{Equation 1}\rangle$$

Here, z is the SAG amount of a surface parallel to the Z axis, c is the curvature at surface vertex, k is the conic coefficient, A is the 4th-order deformation coefficient, B is the 6th-order deformation coefficient, C is the 8th-order deformation coefficient, D is the 10th-order deformation coefficient, E is the 12th-order deformation coefficient, F is the 14th-order deformation coefficient, G is the 16th-order deformation coefficient, H is the 18th-order deformation coefficient, and J is the 20th-order deformation coefficient as described in FIG. 9.

The shape of the first free curved mirror 11, the second free curved mirror 12, and the third free curved mirror 13 will be described below. FIG. 10 is a table describing the shape of a first free curved mirror, a second free curved mirror, and a third free curved mirror of an image display apparatus according to the example embodiment. FIG. 11 is a table for describing coefficients thereof.

The first free curved mirror 11, the second free curved mirror 12, and the third free curved mirror 13 may have, for example, the shape as described in FIG. 10. The shape of the first free curved mirror 11, the second free curved mirror 12, and the third free curved mirror 13 may be defined by Equations 2 to 4 below.

$$z = \frac{cr^2}{1 + \sqrt{1 - (1+k)c^2 r^2}} + \sum_{j=2}^{66} C_j x^m y^n \qquad \langle\text{Equation 2}\rangle$$

$$j = \frac{(m+1)^2 + m + 3n}{2} + 1 \qquad \langle\text{Equation 3}\rangle$$

$$r^2 = x^2 + y^2 \qquad \langle\text{Equation 4}\rangle$$

Here, x is the X coordinate of the reflection surface, y is the Y coordinate of the reflection surface, z is the SAG amount of the surface parallel to the Z axis, k is a conic constant, and $C_j$ is the coefficient of a monomial $x^m y^n$. Here, the X coordinate and the Y coordinate are the X coordinate and the Y coordinate represented by FIGS. 12 to 14.

Next, the arrangement of the diffuser 8, the spherical lens 9, the aspherical lens 10, the first free curved mirror 11, the second free curved mirror 12, and the third free curved mirror 13 will be described below. FIG. 12 is a table describing the position of the diffuser 8, the spherical lens 9, the aspherical lens 10, the first free curved mirror 11, the second free curved mirror 12, and the third free curved mirror 13 of an image display apparatus of the present embodiment. FIG. 13 a table describing the position of a diffuser, a spherical lens, an aspherical lens, a first free curved mirror, a second free curved mirror, and a third free curved mirror of an image display apparatus of an example embodiment when the user's eye has moved to the side surface of the image display apparatus in comparison with the example embodiment of FIG. 12. FIG. 14 a table illustrating the position of a diffuser 8, a spherical lens 9, an aspherical lens 10, a first free curved mirror 11, a second free curved mirror 12, and a third free curved mirror 13 of an image display apparatus of an example embodiment when the user's eye has moved in the opposite side with respect to the side surface of the image display apparatus in comparison with the example embodiment of FIG. 12.

Here, the origin of the XYZ coordinates is the position of the user's eye, a is the inclination (eccentricity) in the X-axis direction, and the +side is the counterclockwise direction when viewed from the −X-axis side in FIG. 2. Also, β is the inclination in the Y-axis direction, and the +side is the counterclockwise direction when viewed from the +Y-axis side in FIG. 2. Also, y is the inclination in the Z-axis direction.

The diffuser 8, the spherical lens 9, the aspherical lens 10, the first free curved mirror 11, the second free curved mirror 12, and the third free curved mirror 13 may have, for example, the arrangement illustrated in FIGS. 12, 13, and 14. In this case, the diffuser 8, the spherical lens 9, and the aspherical lens 10 may move in the Z-axis direction according to the position of the user's eye as described in FIGS. 12, 13, and 14.

As described above, in the image display apparatus 1, three free curved mirrors 11, 12, and 13 may be used in an optical system, and the first free curved mirror 11, the second free curved mirror 12, and the third free curved mirror 13 may be arranged such that the light path of the light output from the first free curved mirror 11, the light path of the light output from the second free curved mirror 12, and the light path of the light output from the third free curved mirror 13 may overlap each other. Thus, the size of the image display apparatus 1 may be reduced or miniaturized in comparison with the related head-up display apparatus.

Because the light output from the first light source 2 and the light output from the second light source 14 are arranged on the same light path and output by the beam splitter 5, images may be simultaneously formed at the left and right eyes without a time delay in the image display panel 17.

Also, when a laser light source is used as the first light source 2 and the second light source 14, the first reducer 20, the second reducer 30, and the third reducer 40 may be provided to reduce speckles occurring in an image formed at the user's eye through the image display panel 17.

Figure 15:
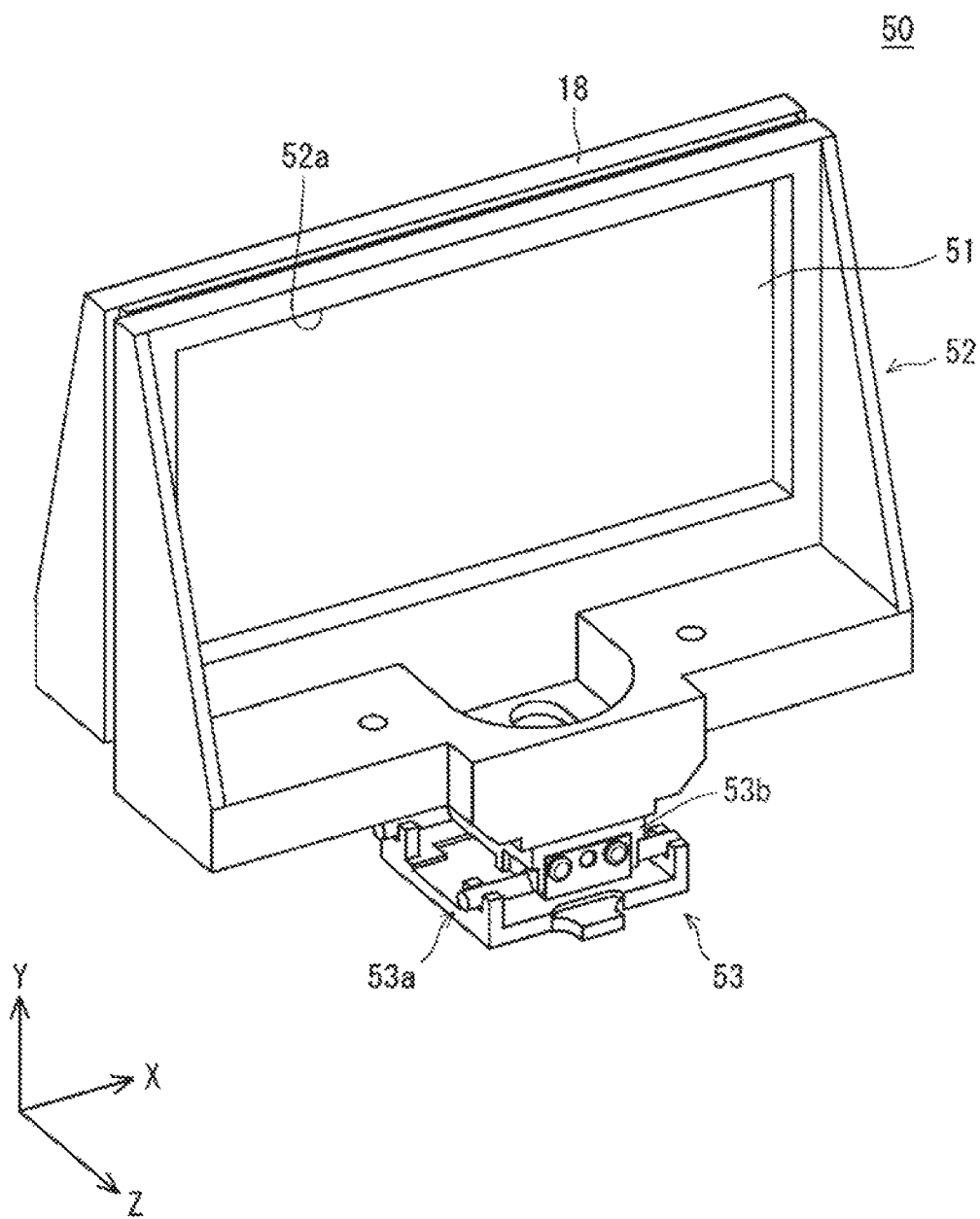
FIG. 15 is a perspective view illustrating a first reducer according to another example embodiment.

It has been described that the diffuser 21 of the first reducer 20 is rotated. However, embodiments are not limited thereto. FIG. 15 is a perspective view illustrating the first reducer 50 according to another example embodiment. As illustrated in FIG. 15, a first reducer 50 of the example embodiment is configured such that a diffuser 51 is swung in the X-axis direction. The first reducer 50 may be arranged to cover the light incidence surface of the diffuser 8 surrounded by a frame 18.

The first reducer 50 may include a diffuser 51, a frame 52, and a driver 53. The diffuser 51 may be, for example, a rectangular diffusion plate. The frame 52 may have an opening portion 52a. The opening portion 52a may be, for example, rectangular and the diffuser 51 may be fixed into the opening portion 52a.

The driver 53 may swing the frame 52 in the X-axis direction. The driver 53 may include, for example, a linear actuator 53a, and the linear actuator 53a and a slider 53b may be fixed to the frame 52. As a result, when the linear actuator 53a is driven, the diffuser 51 may be swung in the X-axis direction through the frame 52. However, although the driver 53 of the example embodiment includes the linear actuator 53a, embodiments are not limited thereto and various modifications may be possible as long as the frame 52 may be rotated in the X-axis direction.

By swinging the diffuser 51 in the X-axis direction, coherent light may be converted into incoherent light, and thus speckle occurrence may be reduced or suppressed. In addition, because the diffuser 51 is swung, the concentration of energy of light at one point of the diffuser 51 may be reduced or suppressed, and thus damage to the diffuser 51 may be reduced or suppressed.

Also, by using a remote phosphor and a quantum dot (QD) sheet as the diffuser 8, it may be possible to reduce or suppress speckles occurring in an image formed at the user's eye through the image display panel 17. For example, the remote phosphor may be formed by applying, to a transparent film, a phosphor for converting wavelengths into green and red by using blue laser light as excitation light, or the phosphor may be formed as a film. The QD sheet may be formed by forming a quantum dot on a transparent film.

The remote phosphor and the QD sheet may output white light when a blue laser is incident thereon. Thus, when the remote phosphor and the QD sheet are used as the diffuser 8, a blue laser light source may be used as the first light source 2 and the second light source 14. In this case, most of the blue light may be converted into green and red light, and the other blue light may pass through the remote phosphor or the QD sheet to become white light.

Due to the remote phosphor and the QD sheet, coherent light may be converted into incoherent light, and thus speckle occurrence may be reduced or suppressed. The remote phosphor and the QD sheet may be configured to rotate or swing similar to the diffusers as described above in example embodiments.

Thus, as described above, the other blue light may pass through the remote phosphor or the QD sheet to reduce or suppress speckles occurring in an image formed at the user's eye.

Also, the concentration of energy of light at one point of the remote phosphor and the QD sheet may be reduced or suppressed, and thus damage to the remote phosphor and the QD sheet may be reduced or suppressed.

The image display apparatus of the example embodiment may be configured to switch between the case of displaying holographic image information or 3D image information on the image display panel 17 and the case of displaying 2D image information on the image display panel 17.

Figure 16:
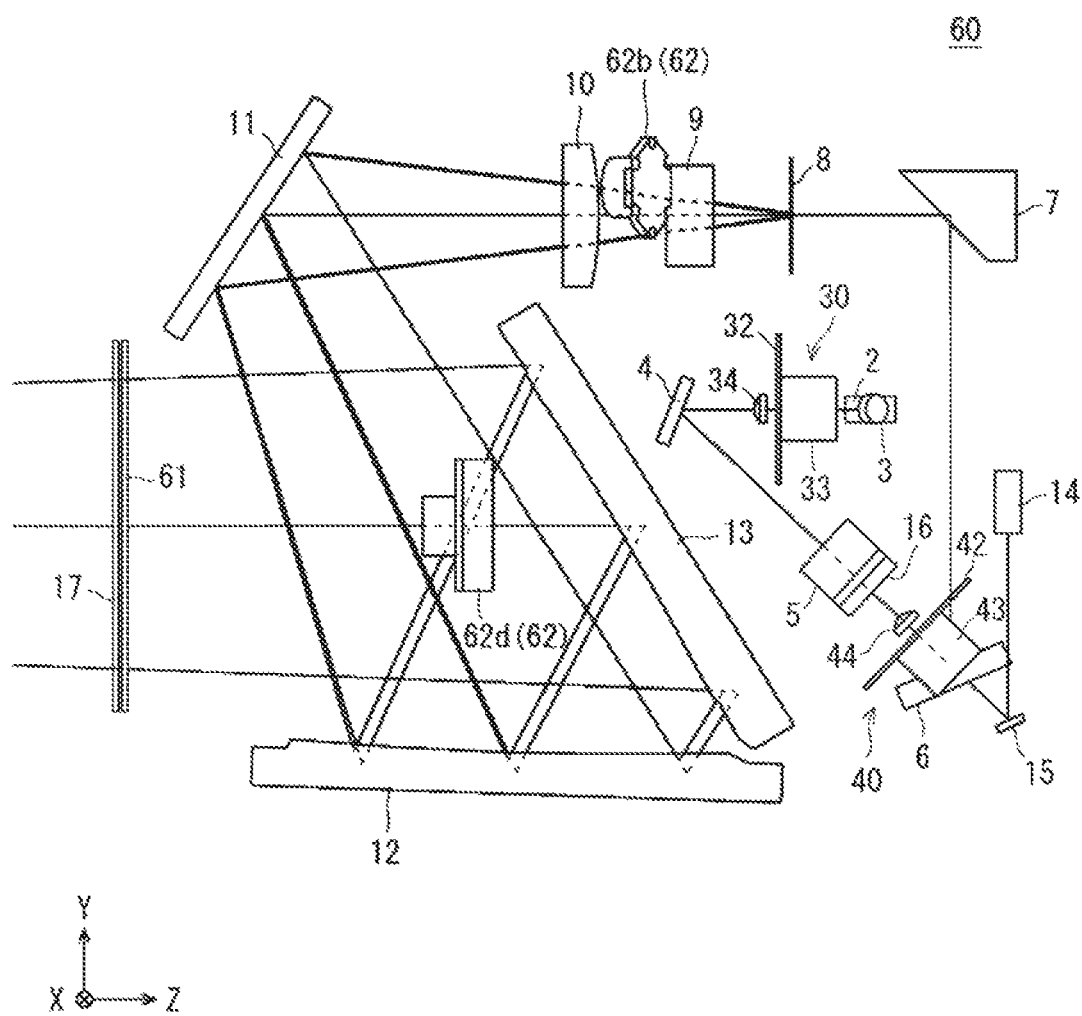
FIG. 16 is a diagram schematically illustrating the arrangement of each element of an image display apparatus according to another example embodiment.
Figure 17:
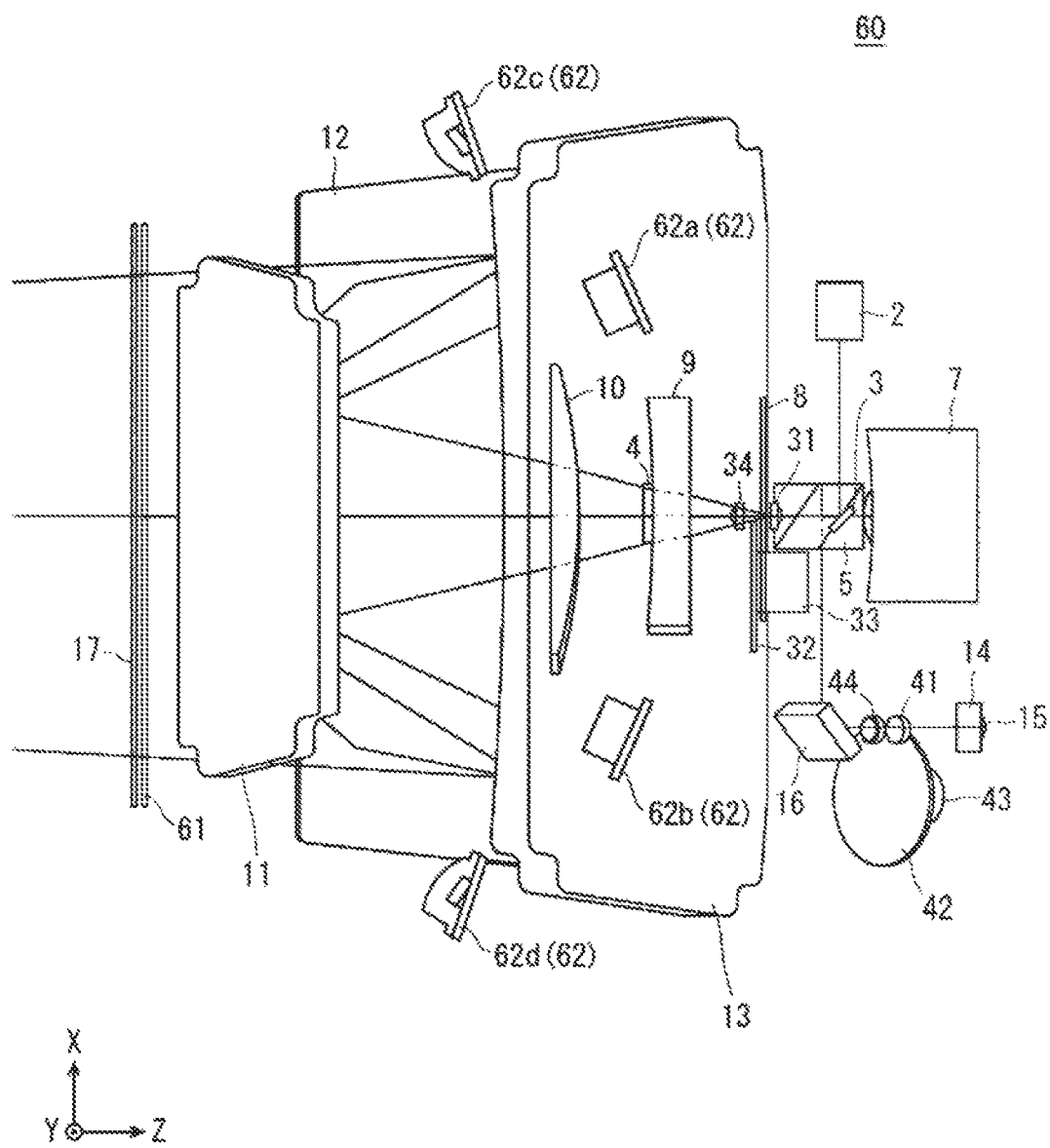
FIG. 17 is another diagram schematically illustrating the arrangement of each element of an image display apparatus according to another example embodiment.

FIG. 16 is a diagram schematically illustrating the arrangement of each element of an image display apparatus according to the example embodiment. FIG. 17 is another diagram schematically illustrating the arrangement of each element of an image display apparatus according to the example embodiment. As illustrated in FIGS. 16 and 17, an image display apparatus 60 of the example embodiment has substantially the same configuration as the image display apparatus 1 of FIG. 2, but may additionally include a polymer dispersed liquid crystal panel 61 and a third light source 62.

In the polymer dispersed liquid crystal panel 61, liquid crystals may be arranged to transmit light when a voltage is applied to the polymer dispersed liquid crystal panel 61, and the liquid crystals may be arranged to scatter light when the voltage application to the polymer dispersed liquid crystal panel 61 is stopped. The polymer dispersed liquid crystal panel 61 may be arranged to entirely cover the light incidence surface of the image display panel 17.

Referring to FIG. 17, the third light source 62 may be arranged such that light may reach the polymer dispersed liquid crystal panel 61. For example, as illustrated in FIGS. 16 and 17, four light emitting diode (LED) light sources 62a, 62b, 62c, and 62d may be provided as the third light source 62.

The LED light sources 62a and 62b may be arranged at both sides of the aspherical lens 10 in the X-axis direction such that the light output from the LED light sources 62a and 62b may be incident on the first free curved mirror 11. The light incident on the first free curved mirror 11 may reach the polymer dispersed liquid crystal panel 61 through the second free curved mirror 12 and the third free curved mirror 13.

The LED light sources 62c and 62d may be arranged at the +Z-axis side of the polymer dispersed liquid crystal panel 61, and configured to not block the light output from the third free curved mirror 13, such that the light output from the LED light sources 62c and 62d may directly reach the polymer dispersed liquid crystal panel 61.

When holographic image information or 3D image information is displayed on the image display panel 17 in the image display apparatus 60, a voltage may be applied to the polymer dispersed liquid crystal panel 61 to output light from the first light source 2 and the second light source 14 in a state where the polymer dispersed liquid crystal panel 61 transmits light. Then, a 3D shape may be formed at the user's eyes through the image display panel 17.

When 2D image information is displayed on the image display panel 17 in the image display apparatus 60, the voltage application to the polymer dispersed liquid crystal panel 61 may be stopped and light may be output from the third light source 62 in a state where the polymer dispersed liquid crystal panel 61 is turned white. The light incident on the polymer dispersed liquid crystal panel 61 may be diffused to irradiate the entire display region of the image display panel 17. As a result, a 2D image may be formed at the user's eyes through the image display panel 17.

As an example, the polymer dispersed liquid crystal panel 61 of the example embodiment is configured to enter a state of transmitting light when a voltage is applied to the polymer dispersed liquid crystal panel 61 and to enter a state of scattering light when the voltage application to the polymer dispersed liquid crystal panel 61 is stopped. However, embodiments are not limited thereto, and the polymer dispersed liquid crystal panel 61 may be configured to enter a state of transmitting light when the voltage application to the polymer dispersed liquid crystal panel 61 is stopped and to enter a state of scattering light when a voltage is applied to the polymer dispersed liquid crystal panel 61.

Also, the third light source 62 may be arranged such that light may reach the polymer dispersed liquid crystal panel 61, and the third light source 62 may be a light source other than the LED light source as long as it may irradiate the light incidence surface of the polymer dispersed liquid crystal panel 61.

Although the present disclosure has been described above in detail with reference to example embodiments thereof, the present disclosure is not limited to the above embodiments and various modifications may be made therein without departing from the spirit and scope of the present disclosure.

For example, the light output from the first light source 2 may be incident on the first scanner 4 without using the first reflection mirror 3, and the light output from the second light source 14 may be incident on the second scanner 16 without using the third reflection mirror 15. That is, the light input path to the parabolic mirror 7 is not limited.

For example, the first light source 2 and the second light source 14 are not limited to a laser light source, and the light output from the first light source 2 and the second light source 14 may irradiate the display region of the image display panel 17. Also, the second light source 14, the third reflection mirror 15, the second scanner 16, and the beam splitter 5 may be omitted.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. An image display apparatus comprising:
    a first light source;
    a spherical lens configured to receive light output from the first light source;
    an aspherical lens configured to receive light output from the spherical lens;
    a first free curved mirror configured to receive light output from the aspherical lens;
    a second free curved mirror configured to receive light output from the first free curved mirror;
    a third free curved mirror configured to receive light output from the second free curved mirror;
    an image display panel configured to receive light output from the third free curved mirror and configured to display image information;
    a diffuser configured to output diffused light to the spherical lens;
    a first scanner configured to receive the light output from the first light source and configured to scan the light output from the first light source to focus the light output from the first light source on an eye of a user based on a detected position of the eye of the user; and
    a parabolic mirror configured to receive light output from the first scanner and configured to output the light output from the first scanner in a direction that is perpendicular to a light incidence surface of the diffuser,
    wherein a first light path of the light output from the first free curved mirror to the second free curved mirror, a second light path of the light output from the second free curved mirror to the third free curved mirror, and a third light path of the light output from the third free curved mirror to the image display panel intersect each other, the first light path intersecting the second light path and the third light path, and the second light path intersecting the third light path.

2. The image display apparatus of claim 1, wherein the diffuser comprises a remote phosphor and a quantum dot sheet.

3. The image display apparatus of claim 1, wherein a light incident surface of the aspherical lens is a convex surface and is configured to output light received from the spherical lens to the first free curved mirror.

4. The image display apparatus of claim 1, further comprising a first reducer provided between the first light source and the first scanner, and configured to reduce speckles included in an image formed through the image display panel.

5. The image display apparatus of claim 4, wherein the first reducer comprises a first collimating lens, a second diffuser, a driver, and a second collimating lens.

6. The image display apparatus of claim 1, further comprising:
    a polymer dispersed liquid crystal panel provided on a light incidence surface of the image display panel; and
    a second light source configured to output light to the polymer dispersed liquid crystal panel.

7. The image display apparatus of claim 6, wherein the polymer dispersed liquid crystal panel is configured to transmit the light based on holographic image information or three-dimensional image information being displayed on the image display panel, and the polymer dispersed liquid crystal panel is configured to disperse light to output the light from the second light source based on two-dimensional image information being displayed on the image display panel.

8. The image display apparatus of claim 1, further comprising:
    a second light source; and
    a beam splitter configured to receive light output from the first light source and light output from the second light source, and configured to output the light output from the first light source and the light output from the second light source such that a light path of the light output from the first light source is on same light path as a light path of the light output from the second light source.

9. The image display apparatus of claim 8, further comprising a second scanner configured to receive light output from the second light source, and configured to scan the light output from the second light source to focus the light output from the second light source on the eye of the user based on a detected position of the eye of the user.

10. The image display apparatus of claim 9, further comprising a first reducer provided between the second light source and the first scanner, and configured to reduce speckles included in an image formed through the image display panel.

11. The image display apparatus of claim 1, further comprising a first reducer provided between the diffuser and the parabolic mirror, and configured to reduce speckles included in an image formed through the image display panel.

12. The image display apparatus of claim 11, wherein the first reducer comprises a first diffuser.

13. The image display apparatus of claim 12, wherein the first diffuser is rotatable.

14. The image display apparatus of claim 11, further comprising a second reducer provided between the first light source and the first scanner.

15. The image display apparatus of claim 14, further comprising:
    a second light source;
    a beam splitter configured to receive light output from the first light source and light output from the second light source, and configured to output the light output from the first light source and the light output from the second light source; and
    a second scanner configured to receive light output from the second light source, and configured to scan the light output from the second light source to focus the light output from the second light source on the eye of the user based on the detected position of the eye of the user.

16. The image display apparatus of claim 15, further comprising a third reducer provided between the second light source and the second scanner.

17. The image display apparatus of claim 16, further comprising:
- a polymer dispersed liquid crystal panel provided on a light incidence surface of the image display panel; and
- a third light source configured to output light to the polymer dispersed liquid crystal panel.

18. An image display apparatus comprising:
- a first light source;
- a spherical lens configured to receive light output from the first light source;
- an aspherical lens configured to receive light output from the spherical lens;
- a first free curved mirror configured to receive light output from the aspherical lens;
- a second free curved mirror configured to receive light output from the first free curved mirror;
- a third free curved mirror configured to receive light output from the second free curved mirror;
- an image display panel configured to receive light output from the third free curved mirror and configured to display image information; and
- a diffuser configured to output diffused light to the spherical lens, wherein a first light path of the light output from the first free curved mirror to the second free curved mirror, a second light path of the light output from the second free curved mirror to the third free curved mirror, and a third light path of the light output from the third free curved mirror to the image display panel intersect each other, the first light path intersecting the second light path and the third light path, and the second light path intersecting the third light path, and wherein the spherical lens, the aspherical lens, and the diffuser are configured to move in a direction of a light path of light passing through the spherical lens, the aspherical lens, and the diffuser to focus the light passing through the spherical lens, the aspherical lens, and the diffuser on an eye of a user based on a detected position of the eye of the user.

* * * * *